US008997720B2

(12) United States Patent
Brown et al.

(10) Patent No.: US 8,997,720 B2
(45) Date of Patent: Apr. 7, 2015

(54) DUAL FUEL INJECTOR WITH CROSSOVER VALVE

(71) Applicants: Cory A. Brown, Peoria, IL (US); Xiangdong Ding, Peoria, IL (US); Hoisan Kim, Dunlap, IL (US); Mayank Mittal, Waukesha, WI (US); Mark F. Sommars, Hopewell, IL (US)

(72) Inventors: Cory A. Brown, Peoria, IL (US); Xiangdong Ding, Peoria, IL (US); Hoisan Kim, Dunlap, IL (US); Mayank Mittal, Waukesha, WI (US); Mark F. Sommars, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 310 days.

(21) Appl. No.: 13/712,052

(22) Filed: Dec. 12, 2012

(65) Prior Publication Data
US 2013/0160742 A1 Jun. 27, 2013

Related U.S. Application Data

(60) Provisional application No. 61/579,840, filed on Dec. 23, 2011.

(51) Int. Cl.
F02M 21/02 (2006.01)
F02M 69/50 (2006.01)
F02M 63/02 (2006.01)
F02M 43/00 (2006.01)
F02M 43/04 (2006.01)

(52) U.S. Cl.
CPC ............ F02M 69/50 (2013.01); F02M 63/029 (2013.01); F02M 43/00 (2013.01); F02M 43/04 (2013.01); F02M 21/02 (2013.01); F02M 21/0275 (2013.01); Y02T 10/32 (2013.01)

(58) Field of Classification Search
CPC ............ F02D 19/0623; F02D 19/0686; F02D 19/0689; F02D 19/0694
USPC ............. 123/299, 304, 525, 575–578, 198 D, 123/27 GE, 510; 239/533.2, 533.3, 533.9
See application file for complete search history.

(56) References Cited

U.S. PATENT DOCUMENTS

| 6,431,471 | B2 | 8/2002 | Anzinger et al. |
| 6,601,566 | B2 | 8/2003 | Gillis et al. |
| 6,725,838 | B2 | 4/2004 | Shafer et al. |
| 6,761,325 | B2 | 7/2004 | Baker et al. |
| 2009/0150050 | A1* | 6/2009 | Mashida et al. ............ 701/103 |
| 2010/0299047 | A1 | 11/2010 | Kratt et al. |

FOREIGN PATENT DOCUMENTS

| JP | 2009138580 | 6/2009 |
| JP | 2011058462 | 3/2011 |
| KR | 1020110133649 | 12/2011 |

* cited by examiner

Primary Examiner — Stephen K Cronin
Assistant Examiner — Robert Werner
(74) Attorney, Agent, or Firm — Uchendu O. Anyaso; John P. Wappel

(57) ABSTRACT

The present disclosure is directed to a fuel circuit of a fuel injector that includes a first channel, a second channel, and a valve. The first channel is configured to receive a first fuel and define a flow path for the first fuel. The second channel is configured to receive a second fuel and define a flow path for the second fuel. The valve is in fluid communication with the first channel and the second channel. The valve is adapted to direct the second fuel to the first channel when a pressure in the first channel reaches a predetermined level.

16 Claims, 4 Drawing Sheets

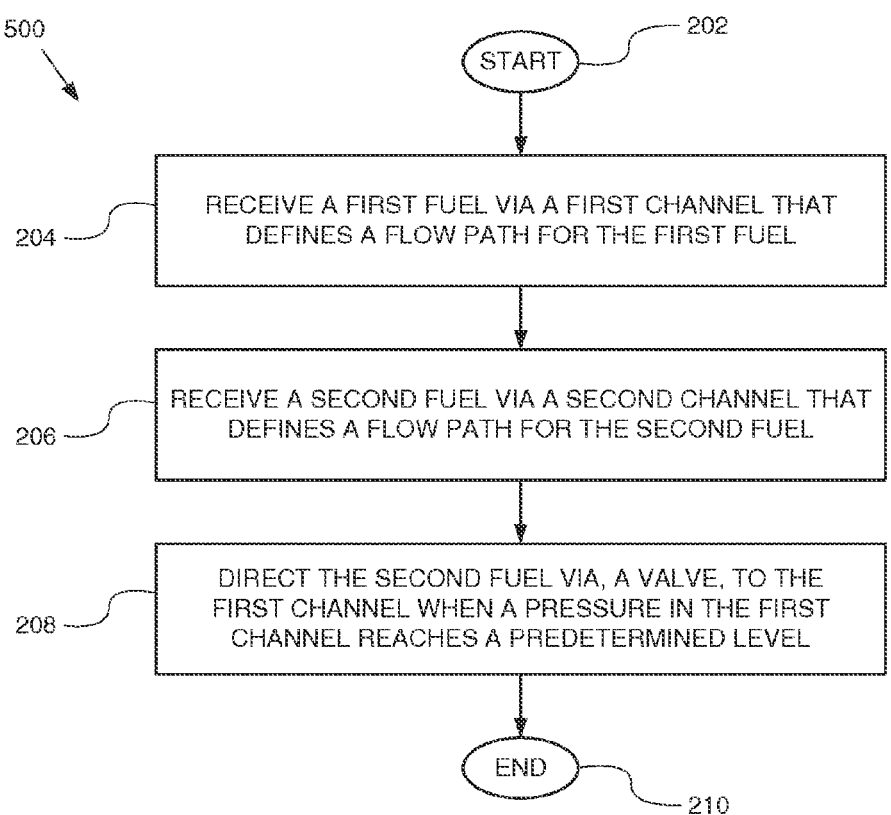

DUAL FUEL INJECTOR WITH CROSSOVER VALVE

RELATED APPLICATIONS

The present disclosure claims priority from U.S. Provisional Application Ser. No. 61/579,840, filed Dec. 23, 2011, which is fully incorporated herein.

TECHNICAL FIELD

The present disclosure relates generally to a system and method for regulating flow of fuel in limp home mode operations of dual fuel engines.

BACKGROUND

In a dual fuel engine, a fuel injector is used to inject liquid fuel, such as diesel distillate, into the engine cylinder, and a second system is responsible for delivering a second type of fuel, such as natural gas. For such dual fuel engines it is desirable to be able to inject two distinct quantities of liquid fuel. A small pilot injection of diesel fuel is used to assist in ignition of a main charge of gaseous fuel when the engine is operating in dual fuel mode. However, when gaseous fuel is unavailable, or for some other reason diesel-only operation of the engine is desired, a larger injection of only diesel is made.

For a dual fuel injector that is configured to run both natural gas and diesel fuel (as a pilot), there are times when it would be desired to be able to operate with diesel fuel only. In an injector designed for 5% diesel fuel and 95% natural gas with two distinct orifice sets, the orifice size and number for the diesel circuit are undersized and there is a challenge for delivering diesel fuel during a diesel-only operation.

In the past, it would have been necessary to use two separate fuel injectors, or at least two separate nozzle assemblies in an engine in order to achieve these operating requirements. For example, one nozzle would have been necessary for the small initial pilot injection, and a second nozzle would have been necessary for the larger diesel-only injection. However, such systems tend to be complex and difficult to control. It is thus desirable to create a system capable of fulfilling the dual fuel injection requirements in situations when there is a deficiency in natural gas supply that causes the dual fuel engine to utilize a diesel-only operation until there is resumption in supply of natural gas to the engine.

U.S. Pat. No. 6,601,566 (the '566 patent) issued to Gillis et al. discloses a method of injecting fuel that includes a step of providing a fuel injector with a plurality of nozzle outlets and a directly controlled dual concentric check assembly. The injector has dual-check nozzles with separate orifices for pilot and main injection that are operated by electronic actuator control. The outer check has a relatively low valve opening pressure and controls a set of orifices with a smaller flow area. The inner check has a relatively high valve opening pressure and controls a set of spray orifices with a relatively large flow area. Combined with a standard unit pump or high pressure fuel common rail, the dual concentric check design provides a fuel injection system capable of higher initial injection pressures. However, the '566 patent fails to disclose the operation of the dual fuel engine when it would desired to operate with diesel fuel only.

It is therefore desirable to provide, among other things, an improved system and method for operating a dual fuel engine in limp home mode.

SUMMARY

In accordance with one embodiment, the present disclosure is directed to a fuel circuit of a fuel injector that includes a first channel, a second channel, and a valve. The first channel is configured to receive a first fuel and define a flow path for the first fuel. The second channel is configured to receive a second fuel and define a flow path for the second fuel. The valve is in fluid communication with the first channel and the second channel. The valve is adapted to direct the second fuel to the first channel when a pressure in the first channel reaches a predetermined level.

In another embodiment, the present disclosure is directed to a method for regulating flow of fuel. The method includes receiving a first fuel via a first channel that defines a flow path for the first fuel. The method also includes receiving a second fuel via a second channel that defines a flow path for the second fuel. Further, the method includes directing the second fuel, via a valve, to the first channel when a pressure in the first channel reaches a predetermined level.

In yet another embodiment, a dual fuel common rail fuel system includes a first fuel source, a second fuel source, a first fuel rail, a second fuel rail, at least one first fuel pump configured to pressurize the first fuel from the first fuel source and deliver the first fuel to the first fuel rail, at least one second fuel pump configured to pressurize the second fuel from the second fuel source and deliver the second fuel to the second fuel rail, and a dual fuel injector configured to fluidly couple to the first rail and to the second fuel rail. The dual fuel injector includes a fuel circuit. The fuel circuit that includes a first channel, a second channel, and a valve. The first channel is configured to receive a first fuel and define a flow path for the first fuel. The second channel is configured to receive a second fuel and define a flow path for the second fuel. The valve is in fluid communication with the first channel and the second channel. The valve is adapted to direct the second fuel to the first channel when a pressure in the first channel reaches a predetermined level.

BRIEF DESCRIPTION OF THE DRAWINGS

FIG. 5 illustrates in flow-chart form a method of operation of a fuel circuit of an engine 5 of a dual fuel machine 10 according to one embodiment.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
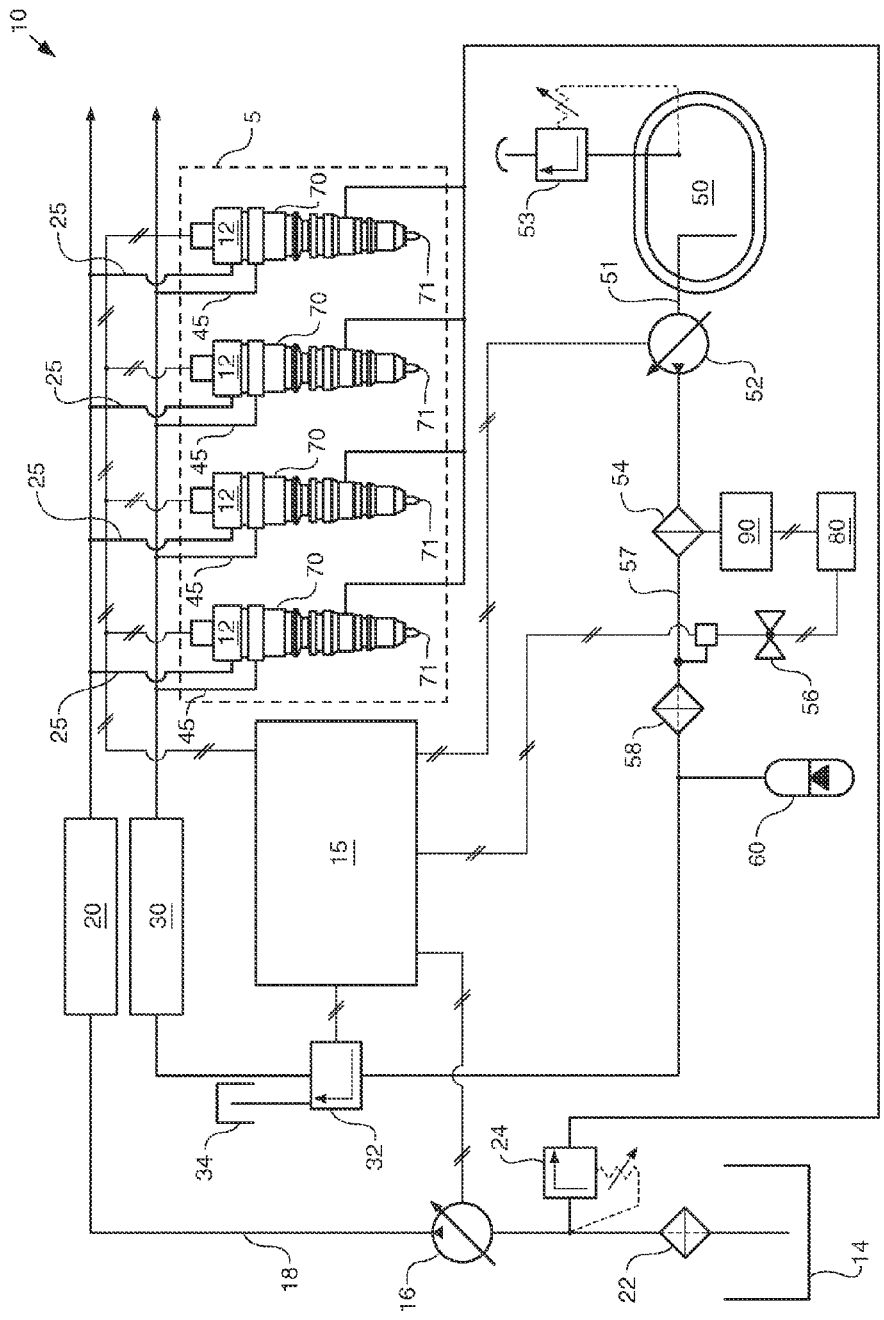
FIG. 1 illustrates a schematic diagram of components of a fuel system in accordance with one embodiment.

FIG. 1 illustrates a schematic diagram of components of a fuel system in accordance with one embodiment. The dual fuel common rail fuel system 10 utilizes dual fuel common rail injectors 12. The dual fuel system 10 includes a plurality of fuel injectors 12 that each include an injector body 70 with a tip component 71 positioned for direct injection of gaseous fuel and/or liquid fuel into respective combustion chambers of associated engine cylinders (not shown). A diesel fuel source 14 contains diesel fuel. A diesel pump 16 draws diesel fuel through diesel supply line 18; pressurizes the diesel fuel; and delivers the pressurized diesel fuel to a diesel fuel rail 20. A filter 22 may be disposed in the diesel supply line 18 upstream of the diesel pump 16 and downstream of the diesel fuel source 14. The filter 22 serves to screen out dirt and rust particles from the fuel. Diesel fuel within the diesel fuel rail 20 may be pressurized to a pressure of approximately 40 MPa at approximately 90° C. Pressurized diesel fuel from the diesel fuel rail 20 may then be delivered to the injectors 12 via diesel fuel line 25.

A quill assembly (not shown) can be used to deliver the diesel fuel from the diesel fuel rail 20 to the injectors 12. Such quill assembly can be configured to receive both diesel fuel and a gaseous fuel such as natural gas. The gaseous fuel from the gaseous rail 30 may be delivered to the injectors 12 as compressed natural gas via gaseous fuel line 45. The quill assembly may further be a coaxial type wherein diesel fuel is disposed within a first quill tube, which is disposed within a second quill tube that carries gaseous fuel. Those skilled in the art will recognize that the gaseous fuel may be any gaseous fuel such as natural gas, propane, methane, liquefied petroleum gas (LPG), synthetic gas, landfill gas, coal gas, biogas from agricultural anaerobic digesters, or any other gaseous fuel.

A back-pressure control valve 24 can be connected between the injectors 12 and the diesel fuel tank 14 to return a quantity of the fuel back to the diesel fuel tank 14 in order to control pressure in liquid fuel common rail 20.

In the illustrated embodiment, natural gas is maintained in a liquid state in a cryogenic liquefied natural gas tank 50 (e.g., gaseous fuel source 50). Gaseous fuel, such as liquefied natural gas may be stored at relatively low temperatures and pressures (−160° C. and 750 kPa). Because gaseous fuel may be stored under such temperatures and pressures, it may be necessary for the gaseous fuel to be kept in a vacuum insulated tank such as a pressurized cryogenic tank. The gaseous fuel source 50 can be configured with a pressure relief valve 53 that serves to relieve pressure from the fuel source 50 when it exceeds a predetermined pressure level. In some cases, the pressure relief valve can be configured to open when the pressure in the fuel source tank 50 exceeds 1400 kPa. Gaseous fuel can be drawn from the gaseous fuel source 50 through a gaseous supply line 51 by a fuel pump 52.

A variable displacement cryogenic pump 52 is controlled by an electronic control module (ECM) 15 to pump liquefied natural gas through a vaporizer 54 for expansion into a gas that can be maintained in an accumulator 60 and then through a high pressure gas filter 58.

The fuel pump 52 may be configured as a variable displacement cryogenic pump. Fuel pump 52 pressurizes and delivers gaseous fuel to a vaporizer 54, which serves to vaporize the liquid natural gas. Such vaporizer 54 serves to heat and/or vaporize cryogenic and low temperature fluids such as the cryogenic liquid natural gas. The vaporized gas can then be delivered to an accumulator 60 via gaseous supply lines 57 and filter 58. In alternative embodiments, a secondary filter can be placed between filter 58 and the accumulator 60 to further filter contaminants within gaseous supply lines 57.

A gas pressure control device 56 according to the present disclosure includes an electronically controlled valve that supplies a controlled quantity of gaseous fuel from the supply side (accumulator 60) to the gaseous fuel common rail 30.

A fuel-conditioning module 32 can be in operative communication with the vaporizer 54, the pressure regulator 56, and the gaseous fuel rail 30. The fuel-conditioning module 32 is intended to maintain the pressure of the gaseous fuel delivered to a gaseous fuel rail 30 at a pressure that is at least 5 MPa below that of the diesel fuel pressure in the diesel fuel rail 20. For instance, within the dual fuel common rail fuel system 10, diesel fuel within the diesel fuel rail 20 may be at a pressure of 40 MPa, while gaseous fuel within the gaseous fuel rail 30 may be at a pressure of 35 MPa.

An electronic control module (ECM) 15 may control various components of dual fuel common rail fuel system 10. For example, the ECM 15 may control the diesel fuel pump 16, LNG fuel pump 52, pressure regulator 56, and injectors 12. Those skilled in the art will recognize that fuel system 10 may further include other components that can also be controlled by ECM 15.

Figure 2:
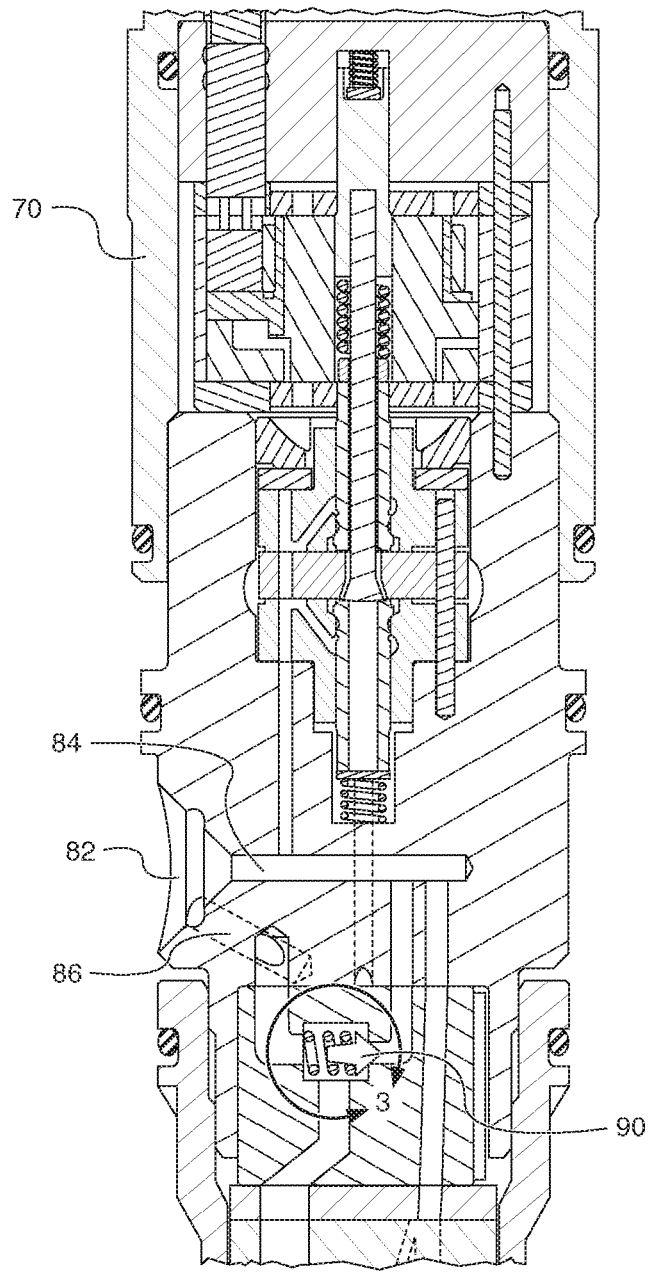
FIG. 2 illustrates the internal structure and fluid circuitry of injector 12 according to a first embodiment.

FIG. 2 illustrates the internal structure and fluid circuitry of injector 12 according to a first embodiment. In particular, an injector body 50 defines a coaxial dual fuel supply inlet 82. Injector body 70 further defines a diesel fuel supply passage 84 and a gaseous fuel supply passage 86, both of which fluidly connect to the dual fuel inlet 82. In the embodiment shown, dual fuel supply inlet 82 can be configured to receive, via a quill tube, diesel fuel to the dual fuel inlet 82 that fluidly connects to diesel fuel supply passage 84 and the gaseous fuel supply passage 86.

Figure 3:
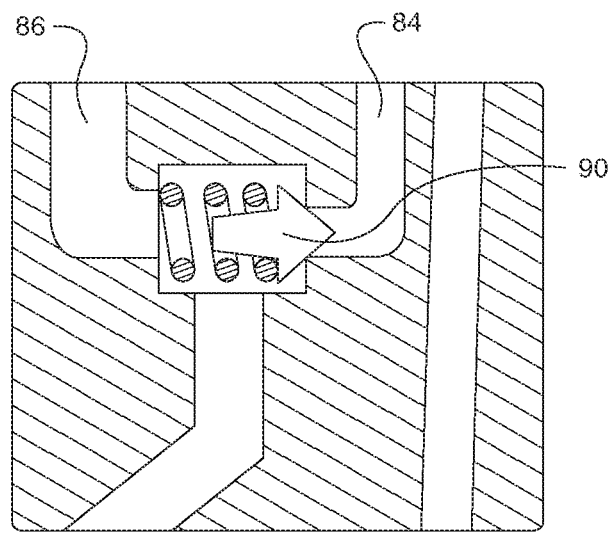
FIG. 3 illustrates a zoom-in of a portion of FIG. 2 that shows the valve 80 located at a junction intersecting the diesel fuel supply passage 54 and the gaseous fuel supply passage 56, when operating in a normal mode.
Figure 4:
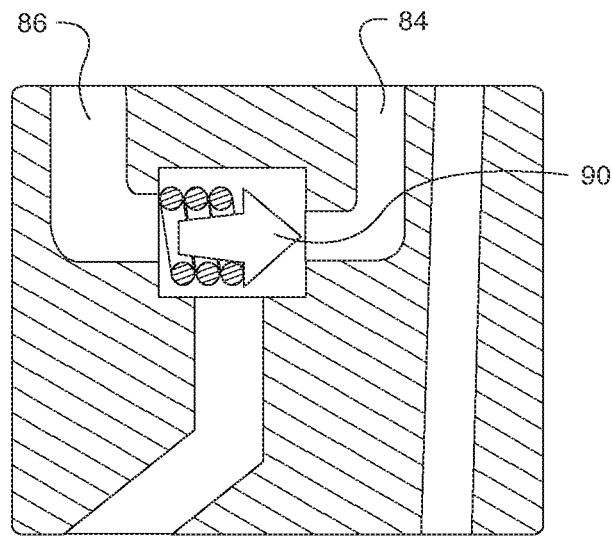
FIG. 4 illustrates a zoom-in of a portion of FIG. 2 that shows the valve 80 located at a junction intersecting the diesel fuel supply passage 54 and the gaseous fuel supply passage 56, when operating in a limp home mode.

FIG. 3 illustrates a zoom-in of a portion of FIG. 2 that shows the valve 90 located at a junction intersecting the diesel fuel supply passage 84 and the gaseous fuel supply passage 86, when operating in a normal mode. The valve 90 is configured to remain closed when the pressure in the gaseous fuel supply passage 86 is at a predetermined level. When a supply of gaseous fuel is interrupted or becomes depleted, the pressure in the gaseous fuel supply passage 56 may drop below the predetermined level. Such drop in the pressure below the predetermined level can cause the valve 90 to open as shown in FIG. 4. In this configuration, the machine or vehicle may operate in the limp home mode. When the valve 90 is in the open position, the diesel fuel from the diesel fuel supply passage 84 is in fluid communication with the gaseous fuel supply passage 86, thereby permitting a supply of the diesel fuel to flow through the gaseous fuel supply passage 86. In this mechanism, diesel fuel may be allowed to flow through the diesel fuel supply passage 84, as well as the gaseous fuel supply passage 86.

INDUSTRIAL APPLICABILITY

The disclosed system 10 can be applicable to any dual fuel machine or engine in cold starting conditions where the pressure of the gaseous fuel may be low or in situations where the gaseous fuel supply is depleted and the liquid fuel (e.g., diesel fuel) is needed to transport the machine or vehicle back to the home base or to a gaseous fuel supply station. The operation of the system 10 will now be explained in connection with the flowchart of FIG. 5.

FIG. 5 illustrates in flow-chart form a method 500 of operation of a fuel circuit 500 of an engine 5 of a dual fuel machine 10 according to one embodiment. The method starts in operation 202. In operation 204, a first channel receives a first fuel. The first channel defines a flow path for the first fuel. In operation 206, a second channel receives a second fuel. The first channel defines a flow path for the first fuel. A valve directs the second fuel to the first channel when a pressure in the first channel reaches a predetermined level, in operation 208. The method ends in operation 210.

The dual fuel system 10 described herein can be used in applications using dual fuel engines (e.g., large mining trucks) that may have a requirement to run on at least 50% power when no natural gas injection is available. This situation is referred to as a limp home mode. As used herein, limp home mode will allow a truck to drive out of the mine at low speed even when the availability of the natural gas system runs empty or fails. When the limp home mode is triggered, the truck is able to return to the shop without being towed.

Thus, sufficient diesel fuel may be injected to achieve such power requirements. However, it may be difficult or stressful for the engine 5 to solely utilize the diesel fuel supply passage 84, to get enough fuel through the very small diesel injection orifices. As such, instead of solely using the diesel orifices for limp home mode injection, a valve 90, located at a confluence of the diesel and gaseous flow path, can be utilized to permit diesel fuel to flow through the gaseous fuel supply passage 86. This may allow the injector 12 to inject diesel through larger gaseous orifices, especially since gaseous fuel orifices are configured to be larger in dimensions than the diesel fuel orifices.

Thus, the engine 5 can pull 50% power with minimal difficulty during a limp home mode operation. No additional restrictions may need to be placed on the normal diesel pilot orifices in that, for example, diesel pilot hole size considerations will not be limited by limp home mode requirements. Also, the injector 12 does not need to function at higher diesel pressures.

The valve 90 can be configured as a solenoid valve, a spool valve, or a shuttle valve to permit diesel fuel to flow through to the gaseous fuel supply passage 86. The valve 90 can also be configured as a spring-biased valve. The spring-biased valve may remain in its closed position whenever a predetermined level of gas pressure is present. When the gas pressure drops below the predetermined level (e.g., no gas available), the diesel fuel may push the valve 90 open. When the gas pressure increases again (e.g., natural gas is now available), the valve 90 may close and the diesel fuel can then be purged from the injector allowing gas injection to start again. The valve 90 can be integrated into the injector body. In alternative embodiments, the valve 80 can be located upstream in the fuel rails 20, 30.

While this disclosure includes particular examples, it is to be understood that the disclosure is not so limited. Numerous modifications, changes, variations, substitutions and equivalents will occur to those skilled in the art without departing from the spirit and scope of the present disclosure upon a study of the drawings, the specification and the following claims.

What is claimed is:

1. A fuel circuit of a fuel injector, comprising:
a first channel configured to receive a first fuel and define a flow path for the first fuel;
a second channel configured to receive a second fuel and define a flow path for the second fuel; and
a valve in fluid communication with the first channel and the second channel, the valve adapted to direct the second fuel to the first channel when a pressure in the first channel reaches a predetermined level.

2. The fuel circuit of claim 1, wherein the valve is at least one of a solenoid valve, a spool valve, a shuttle valve, or a spring-biased valve.

3. The fuel circuit of claim 1, wherein the first fuel is gaseous fuel and the second fuel is diesel fuel.

4. The fuel circuit of claim 1, wherein the first channel is fluidly connected to a gaseous orifice of an injector, the gaseous orifice serving to allow the first fuel to be injected into a combustion chamber.

5. The fuel circuit of claim 1, wherein the second channel is fluidly connected to a diesel orifice of an injector, the diesel orifice serving to allow the second fuel to be injected into a combustion chamber.

6. A method for regulating flow of fuel in a fuel injector, comprising:
receiving a first fuel via a first channel that defines a flow path for the first fuel;
receiving a second fuel via a second channel that defines a flow path for the second fuel; and
directing the second fuel, via a valve, to the first channel when a pressure in the first channel reaches a predetermined level.

7. The method of claim 6, wherein the valve is at least one of a solenoid valve, a spool valve, a shuttle valve, or a spring-biased valve.

8. The method of claim 6, wherein the first fuel is gaseous fuel and the second fuel is diesel fuel.

9. The method of claim 6, wherein the first channel is fluidly connected to a set of gaseous orifices of an injector, the set of gaseous orifices serving to allow the first fuel to be injected into a combustion chamber.

10. The method of claim 6, wherein the second channel is fluidly connected to a set of diesel orifices of an injector, the set of diesel orifices serving to allow the second fuel to be injected into a combustion chamber.

11. A dual fuel common rail fuel system comprising:
a first fuel source;
a second fuel source;
a first fuel rail;
a second fuel rail;
at least one first fuel pump configured pressurize the first fuel from the first fuel source and deliver the first fuel to the first fuel rail;
at least one second fuel pump configured to pressurize the second fuel from the second fuel source and deliver the second fuel to the second fuel rail;
a dual fuel injector fluidly coupled to the first fuel rail and to the second fuel rail, and further comprising:
a fuel circuit, comprising:
a first channel configured to receive the first fuel and define a flow path for the first fuel;
a second channel configured to receive the second fuel and define a flow path for the second fuel; and
a valve in fluid communication with the first channel and the second channel, the valve adapted to direct the second fuel to the first channel when a pressure in the first channel reaches a predetermined level.

12. The dual fuel common rail fuel system of claim 11, wherein the valve is at least one of a solenoid valve, a spool valve, a shuttle valve, or a spring-biased valve.

13. The dual fuel common rail fuel system of claim 11, wherein the first fuel is a gaseous fuel and the second fuel is diesel fuel.

14. The dual fuel common rail fuel system of claim 11, wherein the first channel is fluidly connected to a set of gaseous orifices of the injector, the set of gaseous orifices serving to allow the first fuel to be injected into a combustion chamber.

15. The dual fuel common rail fuel system of claim 11, wherein the second channel is fluidly connected to a set of diesel orifices of the injector, the set of diesel orifices serving to allow the second fuel to be injected into a combustion chamber.

16. The dual fuel common rail fuel system of claim 11, wherein the second fuel is at a pressure approximately 5 MPa higher than the first fuel.

* * * * *